2 Sheets—Sheet 1.

R. CONRADER.

MACHINE FOR GRINDING SPHERICAL OR OTHER CURVED SURFACES.

No. 11,594. Reissued Mar. 23, 1897.

Witnesses.
Alex. Scott
Chas. H. Baker.

Inventor.
Rudolph Conrader
By atty
J. N. McIntire

R. CONRADER.
MACHINE FOR GRINDING SPHERICAL OR OTHER CURVED SURFACES.
No. 11,594. Reissued Mar. 23, 1897.
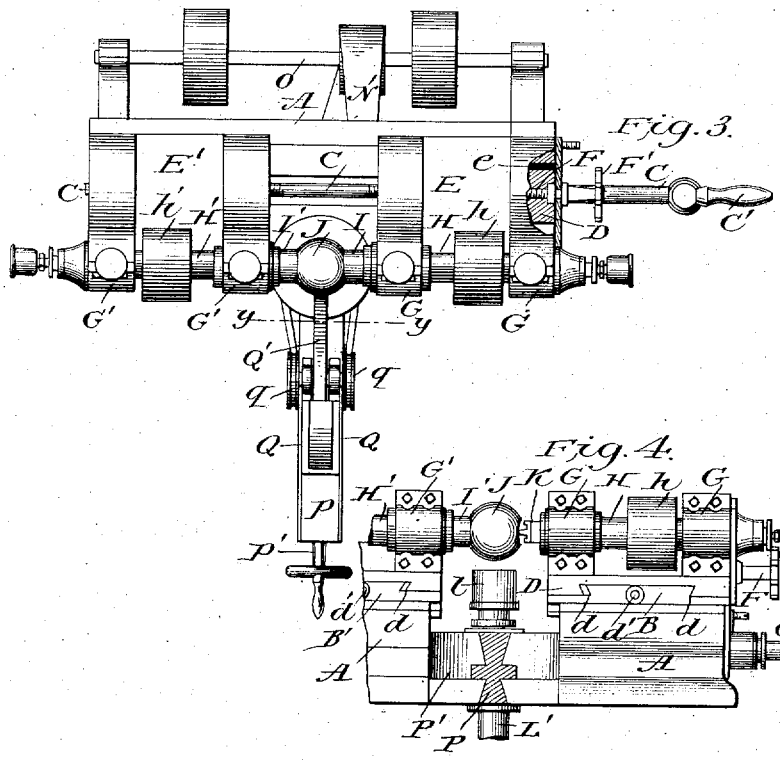
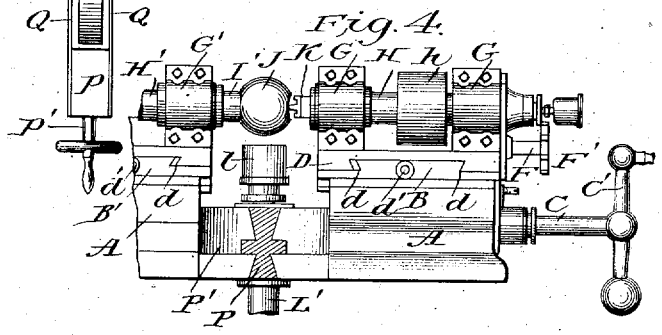
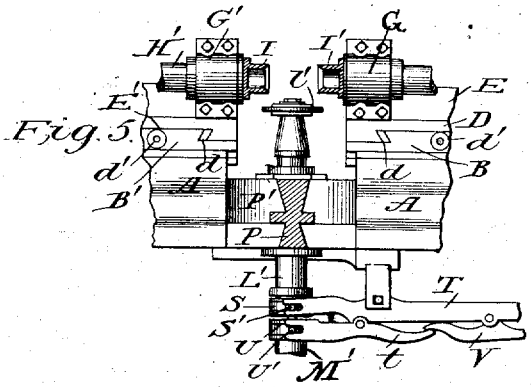
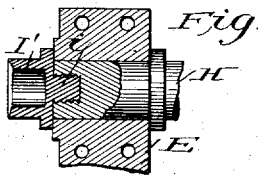
Witnesses.
Alex. Scott
Chas. H. Baker.
Inventor.
Rudolph Conrader
By atty
J. N. McIntire

UNITED STATES PATENT OFFICE.

RUDOLPH CONRADER, OF ERIE, PENNSYLVANIA, ASSIGNOR TO THE BRUNSWICK-BALKE-COLLENDER COMPANY, OF OHIO.

MACHINE FOR GRINDING SPHERICAL OR OTHER CURVED SURFACES.

SPECIFICATION forming part of Reissued Letters Patent No. 11,594, dated March 23, 1897.

Original No. 513,631, dated January 30, 1894. Application for reissue filed January 30, 1896. Serial No. 577,465.

*To all whom it may concern:*

Be it known that I, RUDOLPH CONRADER, a citizen of the United States, residing at Erie, in the county of Erie and State of Pennsylvania, have invented certain new and useful Improvements in Machines for Grinding Spherical or other Curved Surfaces; and I do hereby declare the following to be a full, clear, and exact description of the invention, reference being had to the annexed drawings, which form part of this specification.

My invention consists in the improvements in machines for grinding spherical or other curved surfaces hereinafter fully described, and illustrated in the accompanying drawings, and most particularly pointed out in the claims of this specification.

Figure 1:
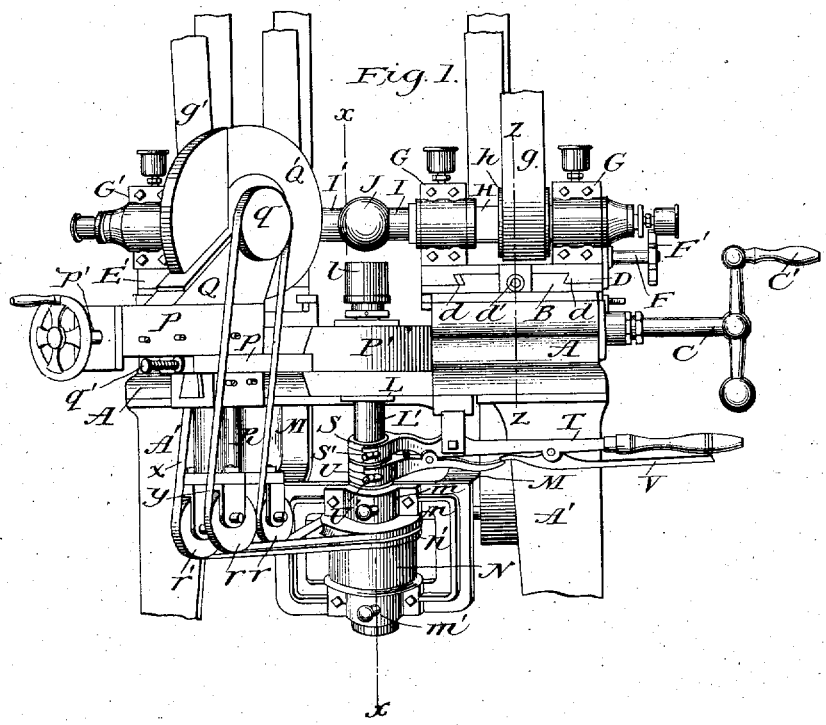
Figure 2:
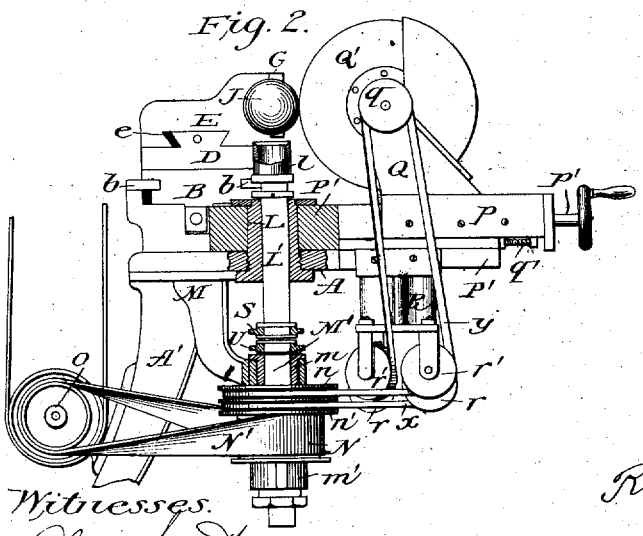
Figure 6:
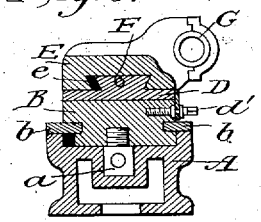

Figure 1 is a perspective view of my improved machine for grinding spherical and other curved surfaces. Fig. 2 is a vertical transverse section of the same on the line *x x* in Fig. 1. Fig. 3 is a top or plan view of the same. Fig. 4 is a longitudinal section of the same on the line *y y* in Fig. 3. Fig. 5 is a vertical longitudinal section of a portion of the machine on a line coincident with the centers of the ball-chucks thereof, showing an arrangement of mechanism for grinding the ball-chucks to like centers. Fig. 6 shows a detail of a portion of the machine in section on the line *z z* in Fig. 1. Fig. 7 is a detail view of a portion of the machine in section.

The object of my invention is to construct a machine adapted, primarily, for grinding and polishing balls of ivory, wood, and other non-metallic materials, though it can be utilized for turning and grinding balls of metal, if desired.

In the construction of my improved machine for grinding spherical and other curved surfaces shown in the drawings, A is the bed of the machine-frame, and A′ A′ the legs thereof. On the ends of this frame are mounted carriages B B′, adapted to move longitudinally in gibs or ways *b b* on the frame A. On the carriages B and B′ are downwardly-projecting lugs or nuts *a*, through which a screw-shaft C passes, provided with a right-hand thread on one end thereof and a left-hand thread on the other, which threads operate in the nuts *a a* on the carriages B and B′, so that the rotation of the screw-shaft C, by means of the crank C′ thereon, operates to move the carriages B and B′ simultaneously toward or away from each other an equal distance toward or from the center of the machine, according to the direction the screw-shaft C is rotated. Upon the carriage B is mounted a plate D, adapted to move transversely on gibs *d* thereon, this transverse movement being adjusted by means of a screw *d′*. Upon the plate D on the carriage B is mounted a third section E of the carriage, which is adapted to be moved longitudinally on ways *e* on the plate D by means of a screw F and hand-wheel F′ thereon, so that the section E of the carriage can be moved longitudinally on the plate D, as and for the purpose hereinafter set forth.

In the construction of the carriage B′ the section E′ thereof operates, by means of an adjusting-screw *d′*, directly on the transverse gibs *d* on the carriage B′ without the intervention of an adjustable section or plate like the section or plate D, upon which the carriage-section E is mounted in the carriage B, so that the carriage-section E′ is not longitudinally adjustable on the carriage B′. These carriage-sections E and E′ are provided with shaft-bearings G G and G′ and G′, in which are mounted longitudinal shafts H and H′, having pulleys *h* and *h′* thereon, adapted to receive driving-belts *g* and *g′*. On the inner ends of the shafts H and H′ are placed removable chucks I I′, adapted to clamp a ball J between them, or, when desired, centers K can be used in place of the chucks I and I′, as illustrated in Fig. 4. By means of this construction a ball J may be clamped and held between the chucks I and I′ or between centers in lieu thereof exactly central. When, however, it is desired to cut out a chipped spot or other defect in one side of a ball without cutting away so much of the ball as to unduly reduce its size, I move back longitudinally the section E of the carriage B by means of the adjusting-screw F. The ball may then be clamped between the chucks or centers with the defective side thereof within the chuck I, the center of the ball being then sufficiently to one side of the center of rotation of the arm P, upon which the grinding-carriage hereinafter described is supported, to cut out the defect therein, and when the surface of the ball so mounted is turned off between the chucks it is removed and the section E of the carriage is moved back to its normal position and the ball then again clamped by its opposite sides between the chucks, so that its center longitudinally coincides with the center of rotation of the arm P, and the remainder thereof, which was covered by the ball-chucks during the first operation, is then turned off, completing it. When, however, the chip in the ball to be turned is so large that it interferes with the proper clamping of it between the chucks, a center K is used to hold the chipped end of the ball until it is turned in one direction, when it is removed and the ball-chuck put in its place, so that the ball can be clamped between them.

Centrally between the ends of the frame-bed A is secured therein a sleeve-bearing L, which projects over the top of the frame A. In this bearing a vertical shaft L′ operates, the upper end of which is adapted to receive a grinding or finishing tool *l* or a chuck-grinding tool *l′*, as desired.

From the under side of the rear of the frame-bed A are arms M, which project downward and curve forward at each side of the lower end of the vertical shaft L′, where they are connected together, and are provided with bearings *m m′*, supporting a vertical shaft M′ directly under the lower end of the shaft L′. A driving-pulley N, having pulleys *n n′* secured thereto, is mounted on said shaft M′, between the bearings *m m′*, and connected therewith by means of an ordinary spline and groove, (not shown,) so that the shaft M′ can be raised and lowered, as and for the purpose hereinafter set forth. Power is communicated to the driving-pulley N by means of a belt N′ from a counter-shaft O at the rear of the machine.

On the top of the frame-bed A is an arm P, provided with a bearing P′, which surrounds and swings on the outside of the sleeve shaft-bearing L. On this arm P is mounted a tool-carriage *p*, adapted to be moved in and out on ways (not shown) thereon by means of a screw-shaft *p′* in the usual manner. On this tool-carriage *p* are arms Q, in which is mounted a rotating grinding-tool Q′, having pulleys *q* on the ends of the shaft thereof. Adjustably secured to the arm P and projecting downward therefrom is an arm R, having on the lower portion thereof idle-pulleys *r r r′ r′*, around which the belts *x* and *y* from the pulleys *n* and *n′* run to the pulleys *q* on the shaft of the rotating grinding-tool Q′ and by means whereof it is driven. In the end of the arm P is an adjusting-screw *q′*, adapted to limit the inward movement of the carriage *p*.

On the lower end of the vertical shaft L′ is a collar S, provided with trunnions S′, which engage with the forked ends of a lever T, pivoted to the machine-frame, and on the upper end of the vertical shafts M′ is a like collar U, provided with trunnions U′, which engage with the forked end of a lever *t*, pivoted to the lever T. A second lever V is also pivoted to the lever T, the inner end of which engages with the outer end of the lever *t*, so that the ends of the shaft L′ and M′ can be forced together and at the same time raised up, so that the grinding or finishing tool *l* on the upper end of the shaft L′ will contact with a ball J, held between the chucks I I′, the upper shaft L′ being driven by the frictional contact of its lower end with the upper end of the shaft M′, but when lowered away from the ball to its normal position the ends of the shafts are far enough apart to be out of contact with each other.

In operation the rough ball is first clamped between the chucks I and I′. The rotating grinding-tool Q′ is then set up into contact with the ball and moved around radially until the portion of the ball outside of the chucks is removed. The ball is then taken out and clamped between the chucks by its opposite sides, and the portion first covered by the chucks is in like manner removed. The finishing-tool *l* is then raised up against the ball, and it is polished or otherwise finished thereby, as desired.

Having thus fully described my invention, so as to enable others to construct and operate the same, what I claim as new, and desire to secure by Letters Patent of the United States, is—

1. In a machine for grinding spherical surfaces, the combination of the two shafts provided with suitable ball-holding devices adapted to move back and forth toward and from a point of meeting, and one of them capable of adjustment to change the meeting-point; a grinding-wheel mounted on a carriage adapted to travel in the arc of a circle about an axis coincident with the meeting-point of said shafts; belt mechanism on said carriage for driving said grinding-wheel; and a driving-pulley, whose axis of motion is coincident with that of the swinging carriage, whereby the belt mechanism is maintained in the proper condition in all the positions, in which said carriage may be placed; all substantially as and for the purpose set forth.

2. The combination in a machine for grinding spherical and other curved surfaces, of a shaft operating in bearings on a laterally-adjustable support mounted on a longitudinally-movable carriage, with a shaft operating in bearings on a laterally and longitudinally adjustable support, mounted on a longitudinally-movable carriage, ball-chucks on the inner ends of said shafts, and means substantially as shown for simultaneously moving said carriages toward and away from each other, substantially as and for the purpose set forth.

3. The combination in a machine for grinding spherical surfaces, of two shafts having chucks thereon adapted to clamp and hold a ball between them; and a grinding-wheel traveling in the arc of a circle around a center coinciding with the center of the ball held between said chucks, with a vertical shaft having a rotating, ball-finishing, tool on the upper end thereof central with and adapted to be brought into contact with a ball held between said chucks; substantially as and for the purpose set forth.

4. The combination in a machine for grinding spherical and other curved surfaces, of a vertical shaft, consisting of sections L′ and M′, the upper section L′ having a grinding or polishing tool on the upper end thereof, and the lower section having a driving-pulley connected therewith, so that it will move longitudinally therein, with levers connected with said shafts adapted to force the adjacent ends of the sections together, so that motion is communicated by the lower section M′ to the upper section L′ and also to raise said shafts up, so as to bring the tool, on the upper section thereof, into contact with the article to be ground; substantially as and for the purpose set forth.

5. The combination in one of the longitudinally-moving carriages of a machine for grinding spherical and other curved surfaces, of a lower section B operating longitudinally in gibs, or ways, on the machine-frame; a section as D operating transversely in gibs on the section B, with a section as E operating longitudinally on gibs on the section D; and a screw mechanism for adjusting said sections upon each other, substantially as and for the purpose set forth.

In testimony whereof I affix my signature in presence of two witnesses.

RUDOLPH CONRADER.

Witnesses:

FRANK C. CANTOR,

C. B. HAYES.